(12) United States Patent
Cantagrel

(10) Patent No.: US 10,141,796 B2
(45) Date of Patent: Nov. 27, 2018

(54) STATOR FOR AC MOTOR FOR AN ELECTROMECHANICAL ACTUATOR (EMA)

(71) Applicant: Goodrich Actuation Systems SAS, Buc (FR)

(72) Inventor: Martin Cantagrel, Versailles (FR)

(73) Assignee: GOODRICH ACTUATION SYSTEMS SAS, Buc (FR)

( * ) Notice: Subject to any disclaimer, the term of this patent is extended or adjusted under 35 U.S.C. 154(b) by 231 days.

(21) Appl. No.: 15/135,857

(22) Filed: Apr. 22, 2016

(65) Prior Publication Data

US 2016/0315507 A1 Oct. 27, 2016

(30) Foreign Application Priority Data

Apr. 24, 2015 (EP) .................................. 15165060

(51) Int. Cl.
  *H02K 1/06* (2006.01)
  *H02K 1/14* (2006.01)
  *H02K 1/02* (2006.01)

(52) U.S. Cl.
  CPC .............. *H02K 1/146* (2013.01); *H02K 1/02* (2013.01)

(58) Field of Classification Search
  CPC .......... H02K 1/148; H02K 1/18; H02K 1/146; H02K 2201/09
  USPC ............................... 310/89, 216.001–216.137
  See application file for complete search history.

(56) References Cited

U.S. PATENT DOCUMENTS

| 6,163,952 A | 12/2000 | Takehara | |
| 6,495,941 B1* | 12/2002 | Nishimura | F02N 11/04 310/168 |
| 2008/0042502 A1* | 2/2008 | VanLuik | H02K 1/32 310/89 |
| 2009/0026872 A1* | 1/2009 | Tomohara | H02K 1/148 310/216.011 |
| 2010/0141059 A1* | 6/2010 | Nishimura | H02K 1/02 310/44 |
| 2012/0205998 A1* | 8/2012 | Seibicke | H02K 5/20 310/64 |

FOREIGN PATENT DOCUMENTS

| EP | 0921621 A2 | 6/1999 |
| JP | S561110454 A | 9/1981 |

OTHER PUBLICATIONS

Extended European Search Report of the European Patent Office for International Application No. EP15165060, dated Dec. 21, 2015, 8 pages.

* cited by examiner

*Primary Examiner* — Thanh Lam
(74) *Attorney, Agent, or Firm* — Cantor Colburn LLP

(57) ABSTRACT

The present invention goes away from conventional teaching and provides a stator having a construction that creates or allows induced currents thus providing a damping function. This effect is provided by forming the stator back iron of a solid piece of iron material or iron alloy as opposed to a stack of laminations or compressed powder.

5 Claims, 2 Drawing Sheets

STATOR FOR AC MOTOR FOR AN ELECTROMECHANICAL ACTUATOR (EMA)

FOREIGN PRIORITY

This application claims priority to European Patent Application No. 15165060.3 filed Apr. 24, 2015, the entire content of which is incorporated herein by reference.

TECHNICAL FIELD

The present invention is concerned with a stator for an AC motor for an electromechanical actuator (EMA).

BACKGROUND OF THE INVENTION

Electromechanical actuators are used in a wide range of technology, for actuating system parts, for example in engine, machine, vehicle or aviation technology.

An electromechanical actuator is driven by an AC motor comprising a stator assembly and a rotor.

For some EMA applications such as flight control actuation, landing gear actuation, steering actuation, safety reasons imply that the motor shall oppose a drag torque, proportional to the revolution speed, in case the electric supply fails. This function is called damping function.

Most conventional electric motors have stator cores constructed from sheets of laminated iron alloy, as shown in FIG. 1. Individual laminations are punched from flat sheets of iron alloy using specially constructed dies with the necessary shape and with slots and teeth incorporated into them. Laminations made by this method are generally coated with a thin insulation layer and are then stacked together to form the laminated stator. It is important that the laminations are stacked in correct alignment and secured together for example by welding. The use of thin laminations prevents induced currents and losses that can adversely affect motor operation.

An alternative, but less widely-used, construction of a stator core involves the use of specially formed iron powder particles pressed into a mold to form the appropriate shape. To avoid losses and to prevent induced currents, special iron particles have to be used, for example iron powder coated with a thermal plastic material and comprising a phosphate layer.

In addition, regardless of which of these methods is used, it is necessary to provide additional componentry to the stator if damping of the motor is required.

Existing systems use additional, or add-on damping devices to provide the required damping. These do, however, have significant negative impact on the overall volume and size of the motor.

The aim of the present invention is to provide a stator that provides effective damping without substantially increasing the volume of the motor.

As mentioned above, in the existing, conventional systems, steps are taken, conventionally by the use of laminations, or, otherwise, by using special powder compositions, to avoid or prevent induced currents.

SUMMARY

The present invention goes away from conventional teaching and provides a stator having a construction that creates or allows induced currents thus providing a damping function.

This effect is provided by forming the stator back iron of a solid piece of iron material or iron alloy as opposed to a stack of laminations or compressed composite powder.

The cylindrical back iron can be molded, from solid iron or iron alloy material, in a single piece. Alternatively, to simplify manufacturing and winding, individual circumferential segments can be formed of the solid metal, which are then fastened together to form a cylindrical back iron. This allows a better slot filling thus the thermal performance at low speed is improved. In addition, the manufacturing time and cost are reduced.

Radially extending teeth are provided on the interior surface of the resulting stator back iron cylinder. Whilst the teeth could be formed by the process for molding the solid metal back iron, an alternative method involves bolting, welding or otherwise fastening the teeth to the inside surface of the cylinder.

Pure iron can be used for the solid back iron component(s). Such a material has a high saturation point, high conductivity, low cost and is easy to manufacture. Other iron materials, iron alloys, etc. can, however, be used. For example, the level of damping of pure iron might be found to be too high and could be reduced using an alloy of iron.

Thus, in the present invention, use is made of the behaviour of solid iron in inducing currents, as opposed to, like in the prior systems, taking steps to prevent or avoid induced currents. This enables a damping function to be provided using active parts of the motor, rather than providing an external device. This limits the overall volume of the motor, as well as reducing costs and manufacturing time.

BRIEF DESCRIPTION OF DRAWINGS

Preferred embodiments will now be described, by way of example only, with reference to the drawings.

DETAILED DESCRIPTION OF THE INVENTION

Figure 1:
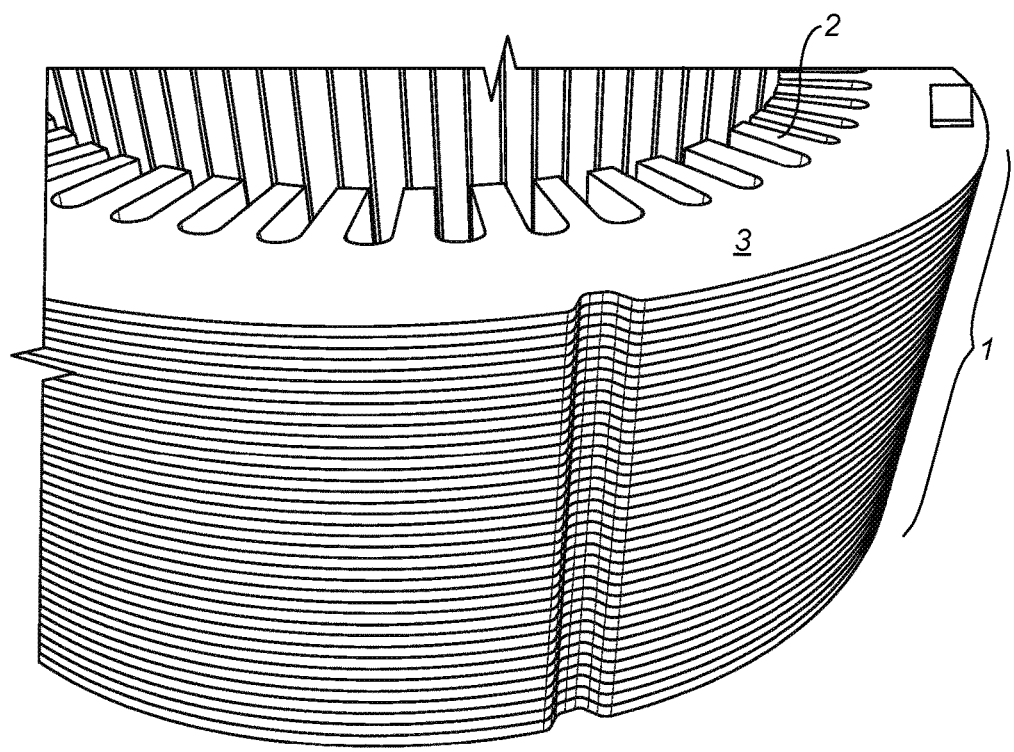
FIG. 1 is a perspective view of a conventional, laminated, stator.

FIG. 1 shows how a conventional stator is formed by stacking a plurality of pre-shaped laminates 1. Each laminate 1 is formed as a flat circular plate or rim, defining the back iron 3", with a plurality of radially inwardly extending teeth 2. Insulation layers are provided between the laminations.

Figure 2:
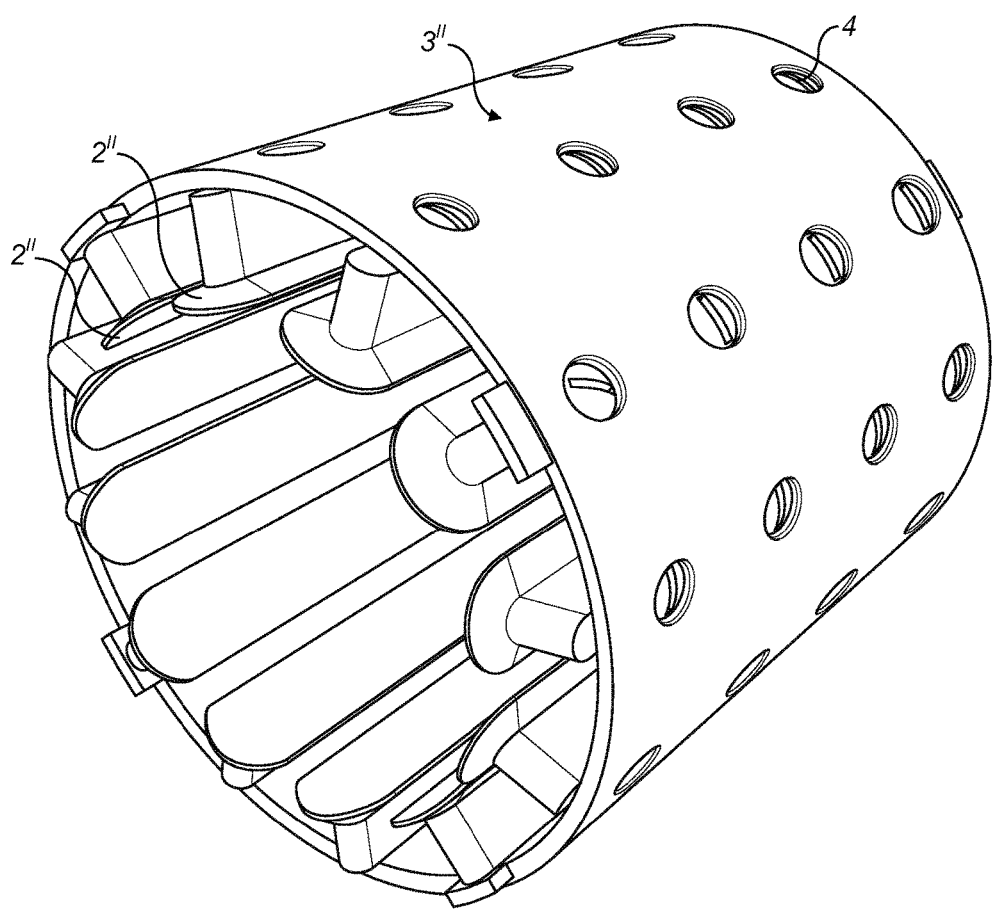
FIG. 2 is a perspective view of a stator in accordance with the present invention.

In the stator of the present invention, as shown in FIG. 2, the back iron 3" is formed from a solid cylinder of iron or iron alloy—i.e. a single piece of solid metal, or cylindrical circumferential segments of iron or iron alloy joined together to form a cylinder. Thus, the stator does not have the iron alloy laminations separated by insulation layers, or, for pressed powder versions, insulated coating on the alloy particles. The stator of the invention is essentially a fully metallic sold stator.

The teeth 2" are then formed, preferably separately, and are attached to the inside of the cylinder, e.g. by screws or bolts 4, to extend radially inwards. In other embodiments, the teeth could be formed integrally with the back iron or attached in another way e.g. by welding.

The fully metallic solid stator creates or allows induced currents which provide the desired damping function in the stator itself.

The invention claimed is:

1. A stator for an AC electrical machine for an electromechanical actuator motor for flight control in an aircraft, the stator comprising a cylindrical stator back iron formed of a single solid metal cylinder or a plurality of solid metal cylinder segments joined to form a cylinder, the metal comprising iron or iron alloy.

2. The stator of claim 1 further comprising a plurality of radially inwardly extending teeth extending from the inner surface of the cylindrical stator back iron.

3. The stator of claim 2 wherein the teeth are fastened to the stator back iron by fastening means.

4. A motor comprising:
a stator as claimed in claim 1, and
a rotor rotatable relative to the stator.

5. An AC electrical machine comprising a motor as claimed in claim 4.

* * * * *